US005608587A

United States Patent [19]

Smith

[11] Patent Number: 5,608,587
[45] Date of Patent: Mar. 4, 1997

[54] METHOD USING MAGNETIC DISK SERVO PATTERN WITH BURIED IDENTIFICATION PATTERNS

[75] Inventor: Robert F. Smith, San Jose, Calif.

[73] Assignee: Seagate Technology, Inc., Scotts Valley, Calif.

[21] Appl. No.: 407,268

[22] Filed: Mar. 20, 1995

Related U.S. Application Data

[63] Continuation of Ser. No. 103,297, Aug. 6, 1993, abandoned.

[51] Int. Cl.⁶ .................................................. G11B 5/596
[52] U.S. Cl. ..................................... 360/77.08; 360/78.14
[58] Field of Search ........................... 360/77.05, 77.07, 360/77.08, 78.04, 78.14; 369/44.26, 44.13

[56] References Cited

U.S. PATENT DOCUMENTS

| | | | |
|---|---|---|---|
| 4,549,232 | 10/1985 | Axmear et al. | 360/77.07 |
| 5,132,854 | 7/1992 | Tsuyoshi et al. | 360/78.14 |
| 5,165,082 | 11/1992 | Tomiyama | 360/77.05 X |
| 5,235,576 | 8/1993 | Shigemori | 369/44.26 X |
| 5,253,131 | 10/1993 | Chevalier | 360/78.14 |

FOREIGN PATENT DOCUMENTS

4302864  10/1992  Japan .................................. 360/78.14

*Primary Examiner*—W. R. Young
*Assistant Examiner*—James L. Habermehl
*Attorney, Agent, or Firm*—Kinney & Lange

[57] ABSTRACT

A surface containing tracks of readable changes in state contains packets of servo control information. The packets of servo control information contain position information and additional information. The position information is amplitude encoded within a series of changes of state. The additional information is angle encoded within the same series of changes of state used to encode position information.

17 Claims, 5 Drawing Sheets

METHOD USING MAGNETIC DISK SERVO PATTERN WITH BURIED IDENTIFICATION PATTERNS

This is a Continuation of application Ser. No. 08/103,297, filed Aug. 6, 1993, now abandoned.

BACKGROUND OF THE INVENTION

The present invention relates to encoding servo control information on a surface to control an apparatus which reads changes of state from the surface. More particularly, the present invention relates to angle encoding additional information within existing amplitude encoded position information.

Surfaces containing radially concentric tracks are used to record and store data for later retrieval. The data is stored along the tracks as a series of changes of state. One example of such a surface is a magnetic disc used in computer disc drives. Data is stored on a magnetic disc by selective polarization of portions of the magnetic surface. The presence or absence of polarity transitions between the polarized portions represents particular binary values.

To recover the data, a reading apparatus must sweep the surface along a specific track. Before the reading apparatus may properly recover the data it must first be correctly positioned over a desired track.

Positioning of the reading apparatus is performed through an iterative process. First, the reading apparatus is positioned somewhere on the disc. Then the reading apparatus reads control information from the disc at that position. From the control information, a controller determines the position of the reading apparatus on the disc. The controller then adjusts the position of the read apparatus based upon the desired location for the read apparatus and the determined position. At its new position, the reading apparatus again reads control information to determine if the move was successful. The process is repeated until the desired location is reached.

In the past, the control information was divided into two separate series of pulses. One series was used to obtain a track identifier (track ID) and a rotational position for the current position of the reading apparatus. The second series was used to determine a position within a track. The division of this information into two separate series is an inefficient use of servo control information space. Inefficient use of the servo control information space reduces the amount of data which may be stored on the surface. Thus, the current method of storing servo control information reduces the amount of data which may be stored on the surface.

In addition, the rotational position and track ID are presently stored using various codes including Gray codes. In order to decode the track ID and rotational position, the decoder must first know the frequency at which the coded information was written. This is accomplished by adding a series of equally spaced pulses before the track ID and rotational position information. This series of pulses, referred to as a synchronization field, is used by the decoder to determine a frequency for expected pulses. Based on that frequency, the decoder determines the existence or nonexistence of pulses within the track ID and rotational position fields. The differences between the series of expected pulses and the series of received pulses represent the encoded information. The addition of the synchronization field before the track ID or rotational position increases the size of the servo control information area and thus reduces the amount of data which may be stored.

SUMMARY OF THE INVENTION

The present invention is a new method for storing and retrieving servo control information from a surface containing tracks of readable changes of state. The servo control information is used to position a reading apparatus on the surface. The present invention replaces two series of pulses for storing the servo control information with one series of pulses. This is accomplished by angle encoding the information usually found in the first series of pulses within the information stored in the second series of pulses.

In one preferred embodiment, the angle encoded information is encoded using phase modulation. With phase modulation a series of changes of state of one polarity is recorded at a constant frequency. A change of state of a second polarity occurs at varying time intervals after each change of state of the first polarity. The length of time between the change of state of the first polarity and the change of state of the second polarity indicates a logical value.

Except for the positioning of the change of state of second polarity within the second series of pulses, the second series of pulses remains the same as in previous methods for recording position information. Thus, existing systems for decoding position information may continue to be used with the present invention.

DETAILED DESCRIPTION OF THE PREFERRED EMBODIMENTS

Figure 1:
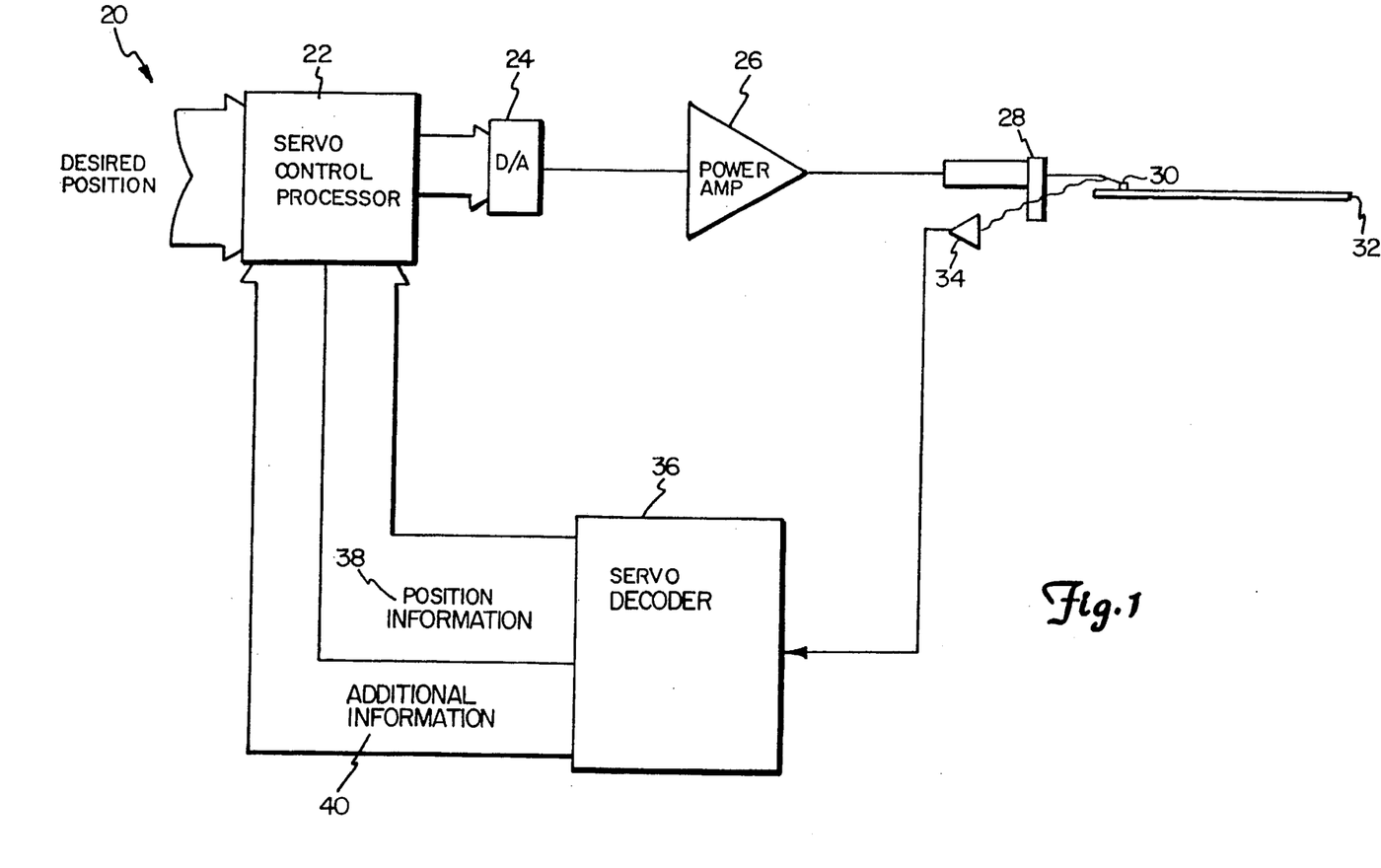
FIG. 1 is a block diagram of a servo control feedback loop.

FIG. 1 is a block diagram of servo control feedback loop 20. Servo control feedback loop 20 comprises servo control processor 22, digital-to-analog converter 24, power amp 26, actuator 28, read apparatus 30, surface 32, read signal amplifier 34 and servo decoder 36.

Servo control processor 22 is coupled to digital-to-analog converter 24, servo decoder 36 and the computer processor unit (CPU) not shown. Servo control processor 22 receives a desired position for read apparatus 30 from the CPU. It also receives position information 38 and additional information 40 from servo decoder 36. Based on the desired position information from the CPU and the information from servo decoder 36, servo control processor 22 produces a digital signal designed to move read apparatus 30 to a desired position.

Digital-to-analog convertor 24 is coupled to servo control processor 22 and power amp 26. Digital-to-analog convertor 24 takes as input the digital signal from servo control processor 22 and converts it into an analog signal which is provided to power amp 26.

Power amp 26 is coupled to digital-to-analog convertor 24 and actuator 28. Power amp 26 takes as input the analog signal from digital-to-analog convertor 24 and boosts the power of that signal to create a boosted power signal capable of controlling actuator 28. Actuator 28 is coupled to power amp 26 and read apparatus 30. Actuator 28 receives the boosted power signal from power amp 26. Actuator 28 moves read apparatus 30 across surface 32 based on the amplitude of the boosted power signal.

Read apparatus 30 is coupled to actuator 28, read signal amplifier 34, and is proximate to surface 32. Read apparatus 30 is physically moved by actuator 28 across surface 32. In addition, read apparatus 30 senses changes of state on surface 32 as the surface passes by read apparatus 30. The changes in state are converted into an electrical signal by read apparatus 30. Read apparatus 30 then transmits a read apparatus output to read signal amplifier 34.

Surface 32 is proximate to read apparatus 30 and spins in a circular manner. Surface 32 contains numerous changes in state representative of data.

Read signal amplifier 34 is coupled to servo decoder 36 and read apparatus 30. It receives read apparatus output from read apparatus 30 and amplifies the read apparatus output to place it in a usable form for servo decoder 36. Servo decoder 36 is coupled to read signal amplifier 34 and servo control processor 22. Servo decoder 36 decodes both position information 38 and additional information 40 from the amplified signal produced by read signal amplifier 34. Servo decoder 36 provides position information 38 and additional information 40 to servo control processor 22. Position information 38 and additional information 40 represent the current surface position of read apparatus 30.

Figures 2, 3A, 3B:
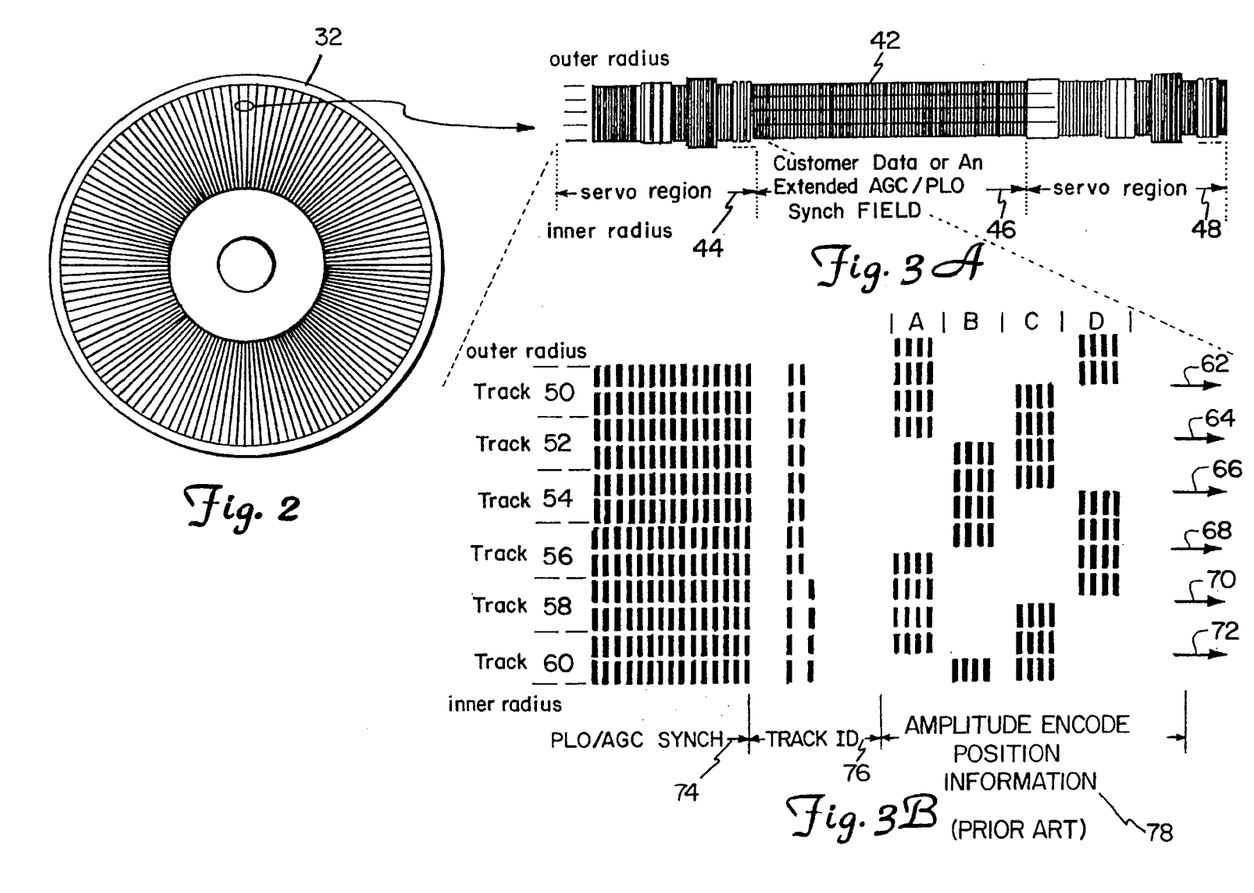
FIG. 2 is a diagram of a readable surface containing tracks divided into sections.
FIG. 3A is a diagram of one section of a readable surface.
FIG. 3B is a diagram of a prior art servo region.

FIG. 2 is a diagram of surface 32 separated into various sections. Each section is comprised of sections of radially concentric tracks which are not shown in FIG. 2.

FIG. 3A is an enlarged view of section 42 of surface 32 of FIG. 2. Section 42 is comprised of servo region 44, customer data or extended AGC/PLO synch field 46 and servo region 48.

Servo region 44 is connected to customer data or extended AGC/PLO synch field 46. Servo region 44 contains servo control information used for controlling the position of read apparatus 30 in FIG. 1. Customer data or extended AGC/PLO synch field 46 is connected to servo regions 44 and 48. Customer data or extended AGC/PLO synch field 46 may be comprised of either recorded data or a series of pulses recorded at a fixed frequency for setting a frequency for servo decoder 36 of FIG. 1. When AGC/PLO synch field 46 is comprised of recorded data, servo regions 44 and 48 are referred to as servo bursts.

Servo region 48 is connected to customer data or extended AGC/PLO synch field 46 and performs the same functions as servo region 44.

FIG. 3B is an expanded diagram of servo region 44 and shows a prior art region for servo control information. Servo region 44 is comprised of PLO/AGC synch 74, track ID 76, and amplitude encoded position information 78. FIG. 3B shows the servo region for tracks 50, 52, 54, 56, 58, and 60.

The center of tracks 50, 52, 54, 56, 58, and 60 are marked by center lines 62, 64, 66, 68, 70, and 72 respectively.

PLO/AGC synch 74 is the first region in servo region 44 and comes directly prior to track ID 76. PLO/AGC synch 74 is a series of pulses set at a fixed frequency for decoding track ID 76. When read apparatus 30 of FIG. 1 passes over PLO/AGC synch field 74, it creates a constant frequency sinusoidal wave. Servo decoder 36 sets a phase locked oscillator to the frequency of the sinusoidal wave. The phase locked oscillator then retains that frequency for use in decoding track ID 76.

Track ID 76 is read directly after PLO/AGC synch field 74 and directly before amplitude encoded position information 78. Track ID 76 contains a pattern of pulses which identifies four consecutive tracks on the surface. Each set of four tracks on the disc has a unique pattern of pulses in track ID 76. The pattern is a code, typically a Gray code, for a track identifier.

Servo decoder 36 of FIG. 1 uses the frequency obtained from reading PLO/AGC synch field 74 to recover the encoded track identifier. The frequency allows servo decoder 36 to determine when a pulse is expected in track ID 76. The presence or absence of an expected pulse in track ID 76 is translated by servo decoder 36 into one of two binary values.

Amplitude encoded position information 78 follows after track ID 76. It is divided into four fields A, B, C, and D. Each field is comprised of a series of alternate radial sections of pulses and radial sections of no pulses. Each radial section covering from the center of one track, across the entire width of an adjoining track, to the center of a third track. Thus, one radial section of pulses in field A covers half of track 56, all of track 58, and half of track 60. The same radial section of pulses is separated from another radial section of pulses by a radial section containing no pulses which extends from the center of track 56, across track 54, to the center of track 52.

The radial sections of pulses in fields A and B are written so that read apparatus 30 will not cross directly over a radial section of pulses in both field A and field B. In other words, the radial sections of pulses in fields A and B are completely radially offset from one another with no radial gap between them. The radial sections of pulses in fields C and D are similarly radially offset from one another.

The radial sections of pulses in fields C and D are further offset from the radial sections of pulses in fields A and B. This offset is such that when read apparatus 30 of FIG. 1 travels along the line where a radial section of pulses in both field A and field B ends, it will cross through the center of a radial section of pulses in either field C or D.

The offset of the radial sections of pulses in each field creates a unique composite pattern for any path taken across the fields within four consecutive tracks. The uniqueness of the pattern allows servo decoder 36 to determine a position within the four tracks.

An identical series of pulses is found in all radial sections of pulses in amplitude encoded position information 78 of the prior art.

Figure 4:
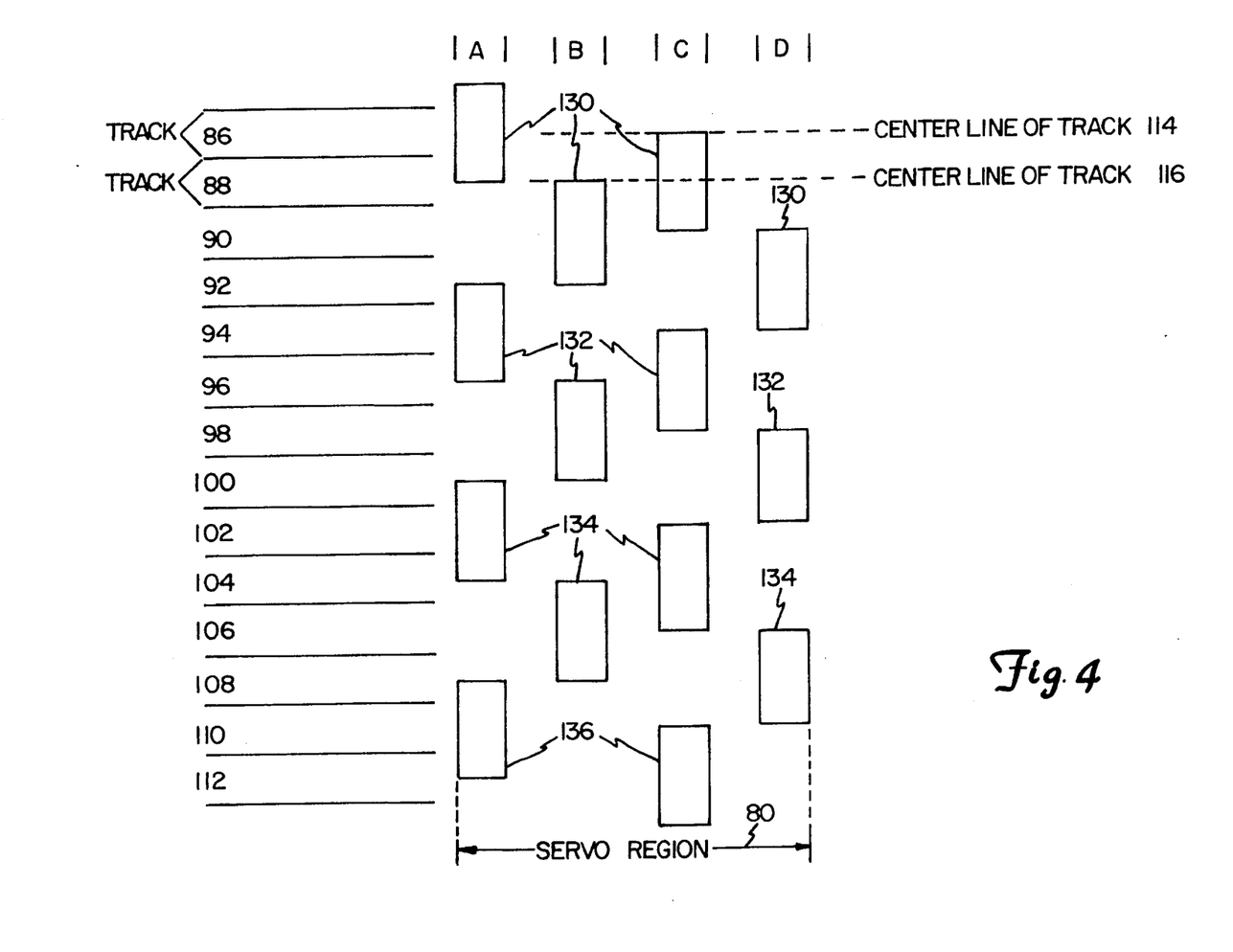
FIG. 4 is an embodiment of a servo region found in the present invention.

FIG. 4 is a diagram of servo region 80 which is an embodiment of servo region 44 for the present invention. Servo region 80 is divided into fields A, B, C, and D in a manner similar to amplitude encoded position information 78 of FIG. 3B. Each field contains radial sections of pulses 130, 132, 134, and 136.

The radial offset of fields A, B, C, and D provide position information in a manner similar to amplitude encoded position information 78 in FIG. 3B. In addition, radial sections of pulses 130, 132, 134, and 136 provide angle encoded additional information. The angle encoded additional information includes, among other things, track identifier information previously found in track ID 76 of FIG. 3B.

The angle encoded additional information found in radial section of pulses 130 of field A is the same information found in radial section of pulses 130 of fields B, C, and D. However, the information in radial section of pulses 130 is different than the information found in radial section of pulses 132, 134, or 136. In fact, the additional information found in each radial section of pulses in a field is unique to that radial section of pulses for that field.

Tracks 94, 96, 98, and 100 each share the same track ID found in radial section of pulses 132. To determine the position of read apparatus 30 (FIG. 1) within those four tracks, servo decoder 36 (FIG. 1) uses the radial offset of radial section of pulses 132 in fields A, B, C, and D. The relative intensity of radial section of pulses 132 in each of the fields indicates the position of read apparatus 30 within tracks 94, 96, 98, and 100. The same technique is performed with tracks 102, 104, 106, and 108 using radial section of pulses 134. Similarly, the position in any other set of four consecutive tracks may be found using a corresponding radial section of pulses.

Center line of track 116 is the center line for track 88 and is depicted as passing directly along the inner radius of radial section of pulses 130 in field A, directly along the outer radius of radial section of pulses 130 in field B, and directly through the center of radial section of pulses 130 in field C. Center line of track 116 does not pass through radial section of pulses 130 in field D.

Figure 5:
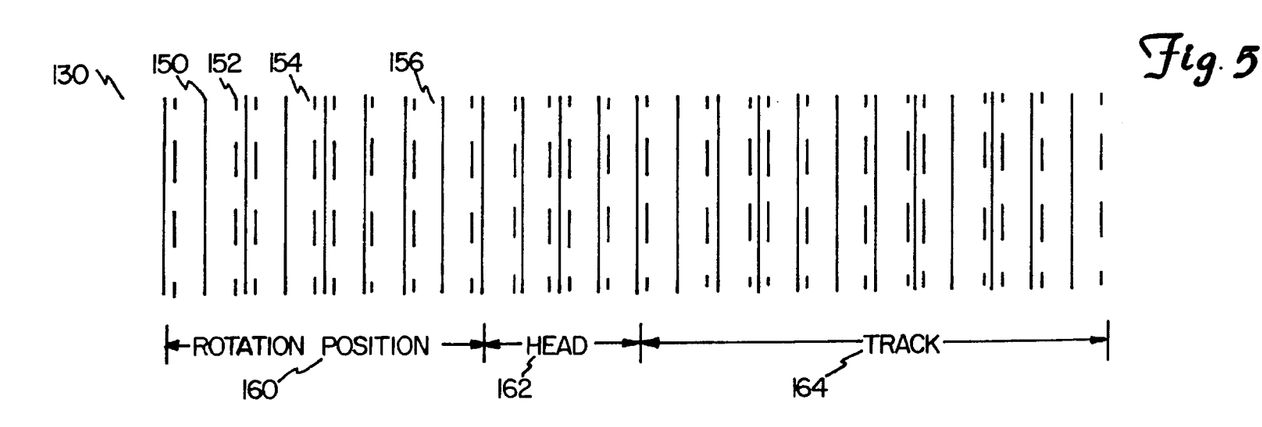
FIG. 5 is a diagram of one position field found in FIG. 4.

FIG. 5 is an enlarged diagram of radial section of pulses 1.30 of FIG. 4. Radial section of pulses 130 comprises positive going transitions 150 and negative going transitions 152. Positive transitions 150 are recorded at a fixed frequency and with a fixed period in radial section of pulses 130. Negative transitions 152 occur in either the first half or second half of the period of the positive transitions 150. If a negative transition occurs within the second half of the period of positive transitions 150, a logical value of one is recorded. Logical-one-code 154 is an example of an encoded logical one. If the negative transition occurs in the first half of the period of positive transitions 150, a logical zero is recorded. Logical-zero-code 156 is an example of an encoded logical zero.

Radial section of pulses 130 further comprises rotation position 160, head 162, and track 164. Rotation position 160 is a series of encoded logical zeros and logical ones which indicate a rotational position to the servo control processor 22 of FIG. 1. Head 162 comprises a series of encoded logical ones and logical zeros recorded directly after rotation position 160. Head 162 is representative of information pertaining to read apparatus 30.

Track 164 is a series of transitions recorded directly after head 162. Track 164 comprises encoded logical zeros and logical ones identifying a position covering four tracks such as tracks 86, 88, 90, and 92 of FIG. 4.

Figure 6:
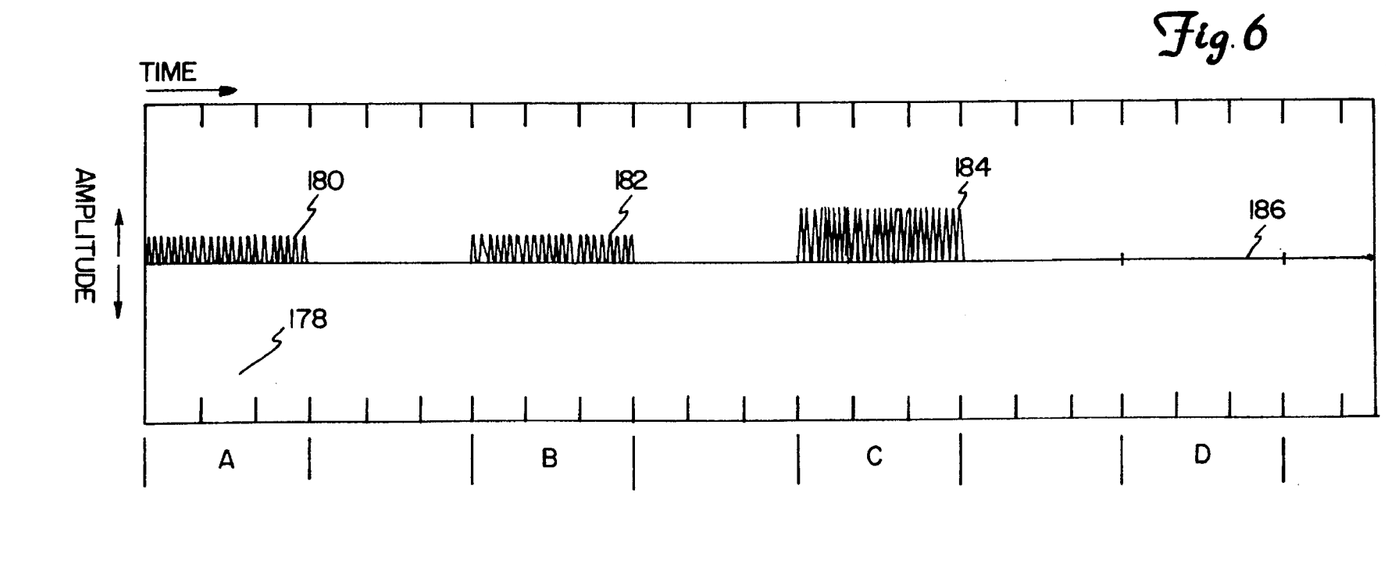
FIG. 6 is a graph of read apparatus output as read apparatus 30 (FIG. 1) passes along center line 116 of FIG. 4.

FIG. 6 is a graph of read apparatus output 178 from read apparatus 30 of FIG. 1 as it passes along center line of track 116 of Figure 4. Read apparatus output 178 is comprised of A output 180, B output 182, C output 184, and D output 186.

A output 180 and B output 182 have amplitudes which are one-half the magnitude of C output 184. D output 186 has an amplitude of zero. The amplitude of the output from each field is controlled by how close read apparatus 30 of FIG. 1 passes to the center of a radial section of pulses within a given field. A output 180 and B output 182 are created as read apparatus 30 of FIG. 1 passes along the edges of radial section of pulses 130 in field A and field B of FIG. 4. This path is shown as center line of track 116 in FIG. 4. C output 184 is created as read apparatus 30 continues along center of track 116 and passes directly over the center of radial section of pulses 130 in field C. D output 186 has no amplitude because center line of track 116 does not bring read apparatus 30 close enough to a radial section of pulses in field D to create an output signal.

For any series of consecutive tracks in FIG. 4, such as 86, 88, 90, and 92, read apparatus 30 will create a unique read apparatus output for all possible positions of read apparatus 30 within those four tracks. Thus, by measuring the total amplitude found in each field, servo decoder 36 is able to precisely locate read apparatus 30 within those four tracks. Techniques for measuring the amplitude in each field are well known in the art and include envelope detection, low pass filtering, and integration of both read apparatus output 178 and the first derivative of read apparatus output 178.

Envelope detection involves measuring a signal which traces only the peaks of read apparatus output 178. Thus, for read apparatus output signal 178, envelope detection would involve measuring a signal of two small smooth curves over fields A and B, one large curve over field C, and a straight line over field D.

Figure 7:
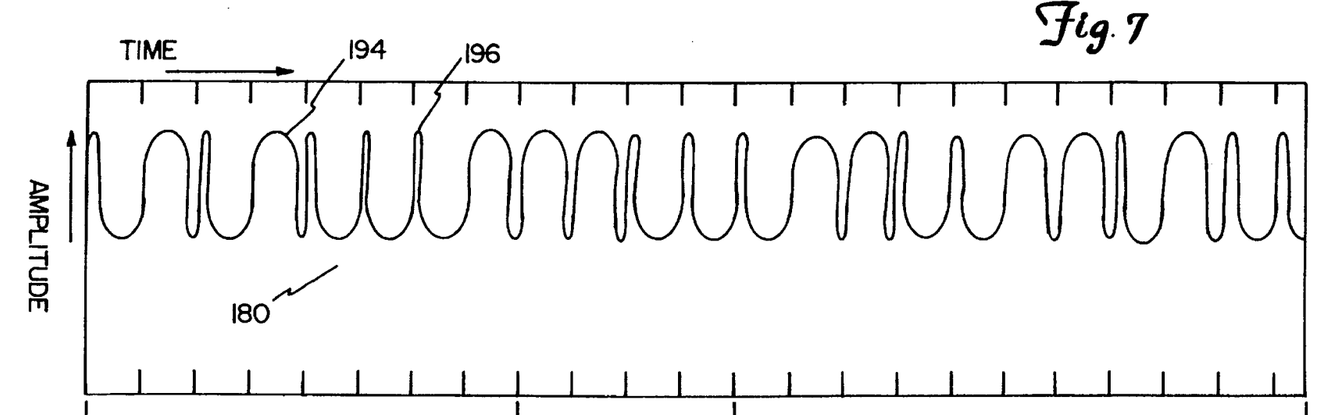
FIG. 7 is an enlarged graph of the read apparatus output as it passes near field A on track 88 of FIG. 4.

FIG. 7 is an enlarged diagram of A output 180 of FIG. 6. A output 180 is divided into sections comprising rotation position 160, head 162, and track 164. The section further comprises logical one transitions 194 and logical zero transitions 196.

In A output 180, positive transitions occur at a fixed frequency and with a fixed period. Logical one transitions 194 are indicated by a positive transition followed by a negative transition occurring within the second half of the period for positive transitions. Logical zero transitions 196 are marked by a positive transition followed by a negative transition occurring within the first half of the period for positive transitions. Thus, logical zero transition 196 creates a thinner positive pulse than logical one transition 194. The series of logical one transitions 194 and logical zero transitions 196 creates binary coded information which is decoded to retrieve information such as a track identifier, head type, and rotation position.

Figure 8:
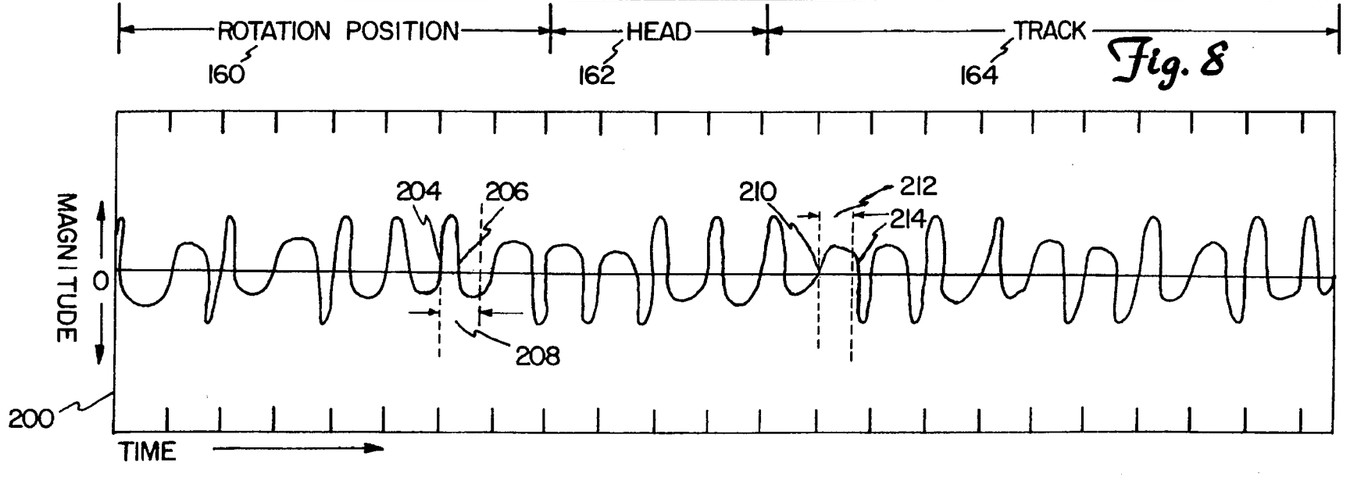
FIG. 8 is a graph of the first derivative of the output found in FIG. 7.

FIG. 8 is a diagram of first time derivative 200 which is the first time derivative of A output 180. First time derivative 200 is used in a method for decoding A output 180 to discover encoded information. First time derivative 200 comprises positive going zero crossings 204 and 210 and negative going zero crossings 206 and 214. FIG. 8 also shows time periods 208 and 212 which are of equal duration.

Positive going zero crossings 204 and 210 in first time derivative 200 represent the beginning of a positive transition from a low state to a high state in A output 180. Negative going zero transitions 206 and 214 represent the beginning of a negative transition from a high state to a low state in A output 180. The time period between a transition in A output 180 from a low state to a high state until a reverse transition from a high state to a low state indicates a binary logical value. Therefore, the measurement of the time period between a positive going zero crossing and a negative going zero crossing in first time derivative 200 is determinative of the logical value of a transition pair in A output 180.

Thus, positive going zero crossing 204 and negative going zero crossing 206 indicate a logical value of zero. This is seen from the fact that negative going zero crossing 206 occurs within time period 208 which marks one-half of the period of positive transitions in A output 180. On the other hand, positive going zero crossing 210 and negative going zero crossing 214 represent a logical value of one in A output 180. This is evident from the fact that negative going zero crossing 214 occurs outside of the time period 212 marking one-half the period of positive transitions in A output 180.

In one preferred embodiment the measurement of whether a negative going zero crossing in first time derivative 200 occurs within a given time period after a positive going zero crossing is performed using a monostable multivibrator. The monostable multivibrator changes logical states with each positive going zero crossing and remains in that state for a fixed period of time before switching back to its previous logical state. If the first time derivative 200 is still greater than zero when the monostable multivibrator switches back to its previous logic state, a logical value of one is decoded. If not, a logical value of zero is decoded.

In conclusion, the encoding of additional information within a series of pulses containing position information in a servo burst reduces the size of the servo burst. It allows the same amount of information to be transmitted within a smaller area. This increases the amount of data which may be stored on a disc.

Although the present invention has been described with reference to preferred embodiments, workers skilled in the art will recognize that changes may be made in form and detail without departing from the spirit and scope of the invention.

What is claimed is:

1. A method for decoding position information and additional information from servo information regions on a magnetic disc, the method comprising:

reading the servo information region to produce a read apparatus output;

using an amplitude decoding algorithm to decode a position from the read apparatus output; and using an angle decoding algorithm to decode additional information from the read apparatus output, the angle decoding algorithm comprising:
determining a first time derivative of the read apparatus output;
enabling a monostable multivibrator for a time interval with each positive going zero crossing of the first time derivative;
recovering a first binary logic value if the first time derivative crosses zero during the time interval; and
recovering a second binary logic value if the first time derivative does not cross zero during the time interval.

2. The method of claim 1 wherein the region containing servo information is embedded in the data of a magnetic disc.

3. The method of claim 1 wherein the additional information is encoded by phase modulation.

4. The method of claim 1 wherein the additional information comprises a track identifier.

5. The method of claim 1 wherein the amplitude decoding algorithm comprises envelope detection.

6. A method of acquiring information for controlling a read apparatus for reading a surface containing tracks of readable changes of state, the method comprising:

embedding a plurality of areas of the surface with servo control information, the servo control information in each area comprising:
a plurality of columns of blocks of transitions, the columns of blocks aligned along and extending in the direction of the radius of the surface, each block of transitions separated from other blocks in the same column by at least one blank area, the blank area containing no transitions;

moving the read apparatus over a path on the surface which intersects all of the columns of blocks in one area of the surface;

producing a read signal with an amplitude and transitions, the amplitude representing the distance from the path to a center of a block in each column and the transitions representing transitions in the blocks of transitions near the path;

determining position information from the amplitude of the read signal; and determining additional information from transitions in a first derivative of the read signal.

7. The method of claim 6 wherein the transitions are phase modulated such that one polarity of transitions occurs at a fixed frequency and the other polarity of transitions occurs at a varying frequency.

8. The method of claim 4 wherein determining additional information comprises:

marking the beginning of a finite time interval after the first time derivative crosses zero;

recovering a first binary logic state if the first time derivative crosses zero during the time interval; and recovering a second binary logic state if the first time derivative does not cross zero during the time interval.

9. The method of claim 6 wherein determining the position information comprises envelope detection of the read signal.

10. The method of claim 6 wherein the additional information comprises a track identifier.

11. A method of storing and retrieving read apparatus control information on a surface, the surface having a center and any position on the surface definable by its distance from the center and its angular position from an arbitrary line drawn from the center, the method comprising:

defining a plurality of amplitude areas, each area separate and distinct from other amplitude areas;

placing one of a plurality of series of transitions in each of the plurality of amplitude areas;

passing a read apparatus over at least two of the amplitude areas at different angular positions from the arbitrary line and producing a read apparatus output from the series of transitions in each amplitude area;

determining position information from the amplitude of the transitions from each amplitude area passed over; and determining other information from transitions in a derivative of the read apparatus output.

12. The method of claim 11 wherein the other information comprises a track identifier.

13. The method of claim 11 wherein the other information is phase modulated.

14. The method of claim 11 wherein each amplitude area covers one full track and half of two other tracks.

15. The method of claim 11 wherein determining other information comprises:

determining a first derivative of the read apparatus output;

starting a time interval when the first derivative crosses zero;

recovering a first binary logic state if the first derivative crosses zero during the time interval; and recovering a second binary logic state if the first derivative does not cross zero during the time interval.

16. A method of acquiring information for controlling a read apparatus for reading a surface containing tracks of readable changes of state, the method comprising:

embedding a plurality of areas of the surface with servo control information, the servo control information in each area comprising:

a plurality of columns of blocks of transitions, the columns of blocks aligned along and extending in the direction of the radius of the surface, each block of transitions separated from other blocks in the same column by at least one blank area, the blank area containing no transitions, each block of transitions in a column having different transitions than all other blocks of transitions in the same column, each column of blocks identical to the other columns of blocks except that each column is offset from all other columns by a distance in the direction of the radius of the surface;

moving the read apparatus over a path on the surface which intersects all of the columns of blocks in one area of the surface;

producing a read signal with an amplitude and transitions, the amplitude representing the distance from the path to a center of a block in each column and the transitions representing transitions in the blocks of transitions near the path;

determining position information from the amplitude of the read signal; and determining additional information from the transitions in the read signal by:

determining a first time derivative of the read signal;

enabling a monostable multivibrator for a time interval with each positive going zero crossing in the first time derivative;

recovering a first binary logic state if the first time derivative crosses zero during the time interval; and recovering a second binary logic state if the first time derivative does not cross zero during the time interval.

17. A method of storing and retrieving read apparatus control information on a surface, the surface having a center and any position on the surface definable by its distance from the center and its angular position from an arbitrary line drawn from the center, the method comprising:

defining a plurality of amplitude areas, each area separate and distinct from other amplitude areas;

placing one of a plurality of series of transitions in each of the plurality of amplitude areas, each series of transitions in the plurality of transitions different than all other series of transitions, at least two of the plurality of amplitude areas having the same series of transitions and no two amplitude areas at the same angle from the arbitrary line having the same series of transitions;

passing a read apparatus over at least two of the amplitude areas at different angular positions from the arbitrary line and producing a read apparatus output from the series of transitions in each amplitude area;

determining position information from the amplitude of the transitions from each amplitude area passed over; and determining other information from the transitions in the series of transitions from each amplitude area passed over by:

determining a first derivative of the read apparatus output;

enabling a monostable multivibrator for a time interval with each positive going zero crossing of the first derivative;

recovering a first binary logic state if the first derivative crosses zero during the time interval; and recovering a second binary logic state if the first derivative does not cross zero during the time interval.

* * * * *

UNITED STATES PATENT AND TRADEMARK OFFICE
CERTIFICATE OF CORRECTION

PATENT NO. : 5,608,587
DATED : MARCH 4, 1997
INVENTOR(S) : ROBERT F. SMITH

It is certified that error appears in the above-indentified patent and that said Letters Patent is hereby corrected as shown below:

Col. 5, line 29, after "field.", delete "."

Col. 5, line 35, delete "1.30", insert --130--

Col. 8, line 23, delete "4", insert --7--

Signed and Sealed this

Twenty-second Day of July, 1997

Attest:

BRUCE LEHMAN

Attesting Officer

Commissioner of Patents and Trademarks